US012103392B2

(12) United States Patent
Cho et al.

(10) Patent No.: US 12,103,392 B2
(45) Date of Patent: Oct. 1, 2024

(54) LEVITATING USER-INTERFACE GADGET

(71) Applicant: SEOYON E-HWA CO., LTD., Anyang (KR)

(72) Inventors: Ju Hwan Cho, Incheon (KR); Dong-Cheol Lim, Pyeongtaek (KR)

(73) Assignee: SEOYONE E-HWA CO., LTD., Anyang (KR)

( * ) Notice: Subject to any disclaimer, the term of this patent is extended or adjusted under 35 U.S.C. 154(b) by 234 days.

(21) Appl. No.: 17/820,130

(22) Filed: Aug. 16, 2022

(65) Prior Publication Data

US 2023/0136995 A1    May 4, 2023

(30) Foreign Application Priority Data

Oct. 29, 2021 (KR) .................. 10-2021-0146541

(51) Int. Cl.
*B60K 35/00* (2024.01)
*B60K 35/10* (2024.01)
*B60K 35/29* (2024.01)

(52) U.S. Cl.
CPC .............. *B60K 35/00* (2013.01); *B60K 35/10* (2024.01); *B60K 35/29* (2024.01); *B60K 2360/1446* (2024.01); *B60K 2360/188* (2024.01); *B60K 2360/47* (2024.01)

(58) Field of Classification Search
CPC ........ B60K 35/00; B60K 35/10; B60K 35/29; B60K 2360/1446; B60K 2360/188; B60K 2360/47; B60K 2360/126; B60K 2360/128; B60K 2360/141; B60Q 3/20; B60Q 3/70

USPC ......................................... 701/36
See application file for complete search history.

(56) References Cited

U.S. PATENT DOCUMENTS

| | | | | |
|---|---|---|---|---|
| 5,619,195 A * | 4/1997 | Allen | ..................... | G05G 9/047 341/20 |
| 6,738,043 B2 * | 5/2004 | Endo | ..................... | H01H 25/041 324/207.13 |
| 7,151,526 B2 * | 12/2006 | Endo | ..................... | H01H 25/041 345/169 |
| 9,690,390 B2 * | 6/2017 | Olsson | ................... | G06F 3/0338 |
| 9,831,872 B1 * | 11/2017 | Salter | ................... | B60H 1/0065 |

(Continued)

FOREIGN PATENT DOCUMENTS

| | | |
|---|---|---|
| CN | 113179049 A | 7/2021 |
| JP | 2002007059 A | 1/2002 |

(Continued)

*Primary Examiner* — Muhammad Shafi
(74) *Attorney, Agent, or Firm* — Harvest IP Law, LLP (57) ABSTRACT

Disclosed herein a user interface device includes a levitating knob configured to detect an input by a user's manipulation; a knob holder configured to be held when the levitating knob does not levitate; a lifting driver provided below the knob holder so that the levitating knob rises from the knob holder and levitates; and an anti-separation section disposed to be spaced apart from the levitating knob by a predetermined distance so that the raised levitating knob does not deviate from an upper side of the knob holder; and wherein the levitating knob is provided with a first magnet, the lift driver is provided with a second magnet arranged to face the first magnet, the second magnet having the same pole as the first magnet on facing surface thereagainst, the lift driver is configured to levitate or hold the levitating knob by driving up or down the second magnet.

10 Claims, 6 Drawing Sheets

(56) References Cited

U.S. PATENT DOCUMENTS

| | | | |
|---|---|---|---|
| 10,121,617 B2* | 11/2018 | Rutledge | G06F 3/0338 |
| 2001/0055002 A1* | 12/2001 | Endo | H01H 25/041 |
| | | | 345/161 |
| 2004/0183778 A1* | 9/2004 | Endo | G06F 3/0338 |
| | | | 345/170 |
| 2020/0201009 A1* | 6/2020 | Lim | G02B 19/0047 |

FOREIGN PATENT DOCUMENTS

| | | |
|---|---|---|
| KR | 101251036 B1 | 4/2013 |
| KR | 101439160 B1 | 9/2014 |
| KR | 101537023 B1 | 7/2015 |
| KR | 20-20170003954 U | 11/2017 |
| WO | 2020126673 A1 | 6/2020 |

\* cited by examiner

LEVITATING USER-INTERFACE GADGET

CROSS-REFERENCE TO RELATED APPLICATION(S)

This application is based on and claims priority under 35 U.S.C. § 119 to Korean Patent Application No. 10-2021-0146541, filed on Oct. 29, 2021 in the Korean Intellectual Property Office, the disclosure of which is incorporated herein by reference in its entirety.

TECHNICAL FIELD

The present disclosure relates to a levitating type user interface device, and more particularly, to a levitating user interface device that detects a user's input by levitating in a holder by a magnetic force of a magnet.

BACKGROUND

Generally, vehicles have a center fascia, which is provided with various systems that may be controlled by a user. For example, such various systems provided in a center fascia of a vehicle include navigation, radio, and air conditioning control system, and the like. To control such various systems, an input device for receiving a user's input may be provided.

Recently, a center fascia of a vehicle does not merely serve to input/output information, but a key role in an interior design of the vehicle. In other words, interior designs of the vehicle may be configured through an overall shape the center fascia, through the shape and arrangement of input devices such as buttons and knobs and of output devices such as displays and ambient lights, and further have become very important in providing a user experience (UX) that may give users a new feeling.

SUMMARY

An aspect of the disclosure is to provide a user interface device capable of detecting a user's input by levitating in a holder by a magnetic force of a magnet.

Additional aspects of the disclosure will be set forth in part in the description which follows and, in part, will be obvious from the description, or may be learned by practice of the disclosure.

In accordance with an aspect of the disclosure, a user interface device includes a levitating knob configured to detect an input by a user's manipulation; a knob holder configured to be held when the levitating knob does not levitate; a lifting driver provided below the knob holder so that the levitating knob rises from the knob holder and levitates; and an anti-separation section disposed to be spaced apart from the levitating knob by a predetermined distance so that the raised levitating knob does not deviate from an upper side of the knob holder; and wherein the levitating knob is provided with a first magnet, the lift driver is provided with a second magnet arranged to face the first magnet, the second magnet having the same pole as that of the first magnet on facing surface thereagainst, the lift driver is configured to levitate or hold the levitating knob by driving up or down the second magnet.

The levitating knob may include a knob cover forming an exterior of the levitating knob, a first light emitting device disposed inside the knob cover, and an input detector configured to detect the input by the user's manipulation, wherein the knob cover is partially or entirely formed of a light-transmitting material.

The first light emitting device may change color or brightness thereof based on detection information of the input detector.

The levitating knob may further include a wireless communicator for performing wireless communication with an external device, and the first light emitting device may change color or brightness based on a signal received through the wireless communicator.

The knob holder further may include a power supply for supplying power to the levitating knob, and the levitating knob further includes a power receiver configured to receive power from the power supply; and a rechargeable battery configured to store the supplied power.

The power supply may be a wireless charging device.

The user interface device may further include a second light emitting device configured to apply a lighting to the anti-separation section.

The anti-separation section may be formed of a light-transmitting material, and the second light emitting device applies a lighting to an inside of the anti-separation section.

The levitating knob may include an input detector configured to detect an input by a user's manipulation, and the second light emitting device may change color or brightness based on detection information of the input detector.

The levitating knob may be provided with a protrusion having a shape protruding along an outer circumferential surface in a horizontal direction thereof, and the anti-separation section is arranged to be spaced apart by a predetermined distance so as to cover all or a part of an upper side of the protrusion of the levitating knob.

BRIEF DESCRIPTION OF THE DRAWINGS

These and/or other aspects of the disclosure will become apparent and more readily appreciated from the following description of the exemplary embodiments, taken in conjunction with the accompanying drawings, of which.

DETAILED DESCRIPTION

Hereinafter, the embodiments of the disclosure will be described in detail with reference to accompanying drawings. It should be understood that the terms used in the specification and the appended claims should not be construed as limited to general and dictionary meanings, but interpreted based on the meanings and concepts corresponding to technical aspects of the disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

Figure 1:
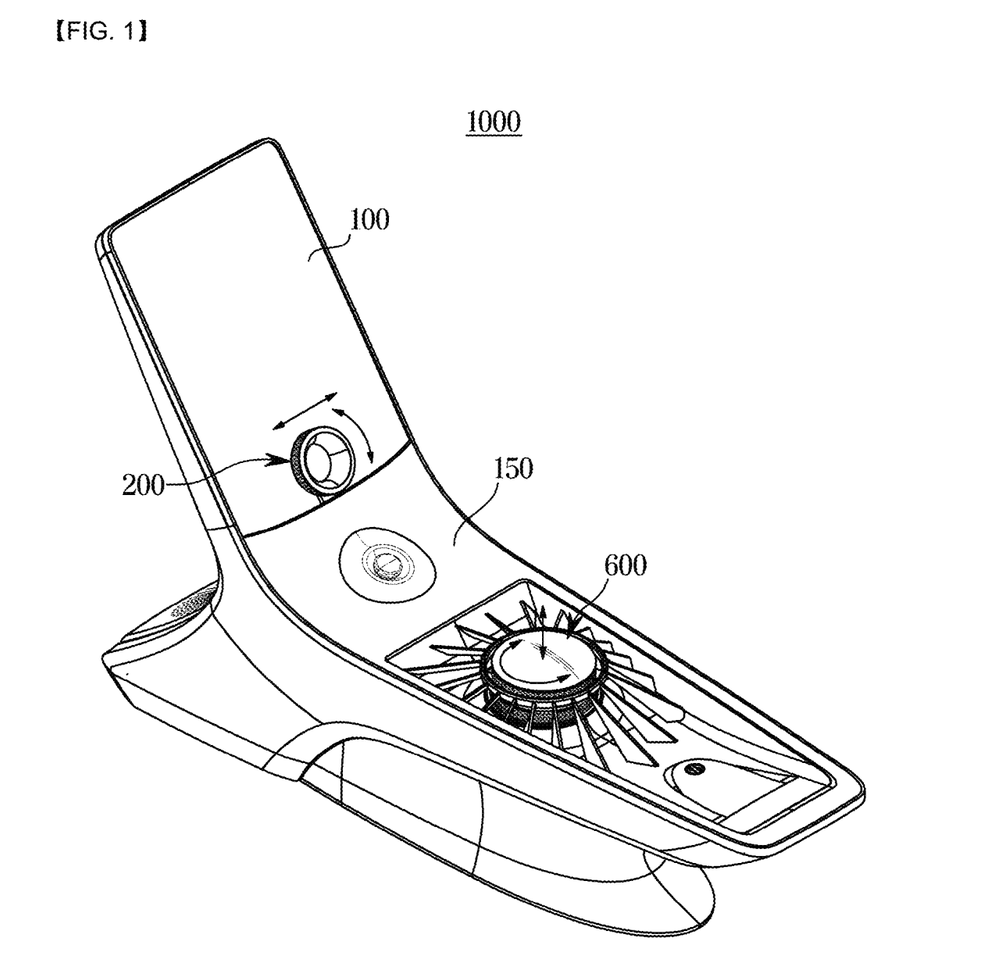
FIG. 1 is a schematic view illustrating a user interface device according to an embodiment of the disclosure.

FIG. 1 is a schematic view illustrating a user interface device according to an embodiment of the disclosure.

A user interface device 1000 may be provided on a center fascia of a vehicle to concisely provide driving environment information through a display 100, and at the same time, control an in-vehicle system through a physical manipulation method of a knob 200. The knob 200 may slide on a display surface of the display 100 and may detect a rotation input.

On the other hand, the user interface apparatus 1000 may include a levitating knob 600 to detect an input by a user's manipulation. As shown in FIG. 1, the levitating knob 600 may detect a user's input by rising or falling at a predetermined mounting position. A user may manipulate the levitating knob 600 by touching, rotating, or pressing down.

Figure 2A:
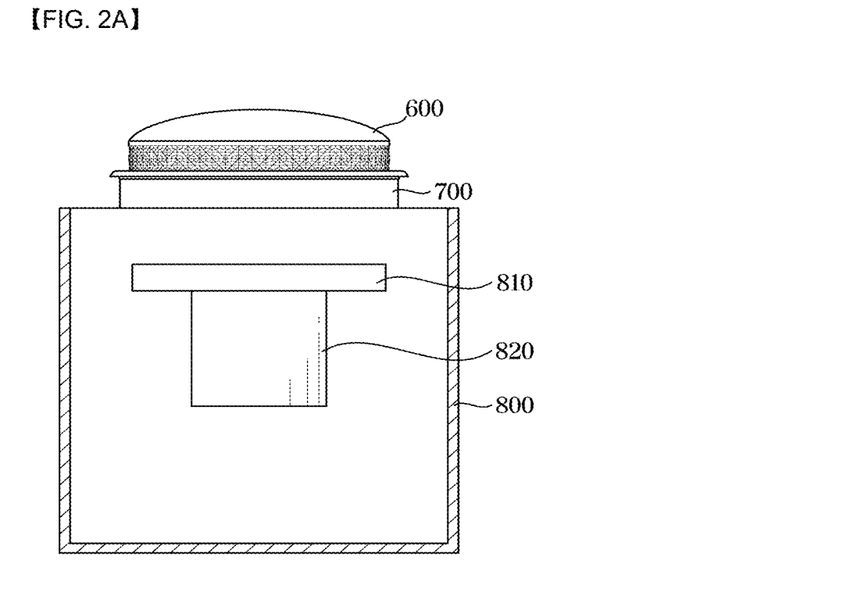
FIGS. 2A and 2B are schematic views illustrating a levitating operation of a levitating knob of a user interface device according to an embodiment of the disclosure.
Figure 2B:
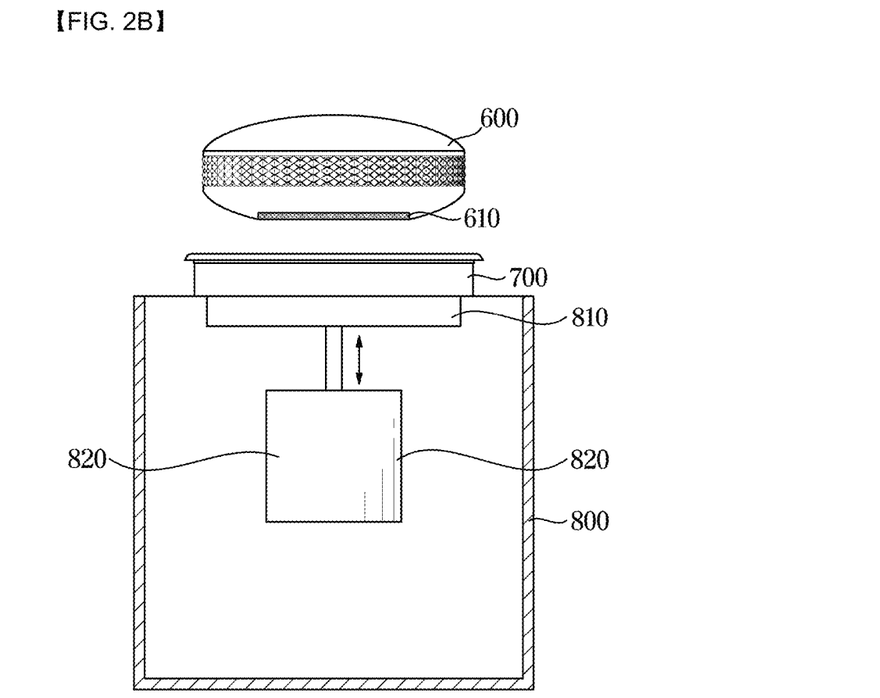

FIG. 2 is a schematic view illustrating a levitating operation of the levitating knob of a user interface device according to an embodiment of the disclosure.

Referring to FIG. 2, the user interface device 1000 may include the levitating knob 600 for detecting an input by a user's manipulation; a knob holder 700 mounted when the levitating knob 600 is not levitating, and a lifting driver 800 provided under the knob holder so that the levitating knob 600 rises and floats in the knob holder 700.

FIG. 2A shows a state in which the levitating knob 600 is mounted on the knob holder (or a mounting portion) 700.

The levitating knob 600 may be provided with a first magnet 610. In this case, the lifting driver 800 may include a second magnet 810 disposed to face the first magnet 610 so that the first magnet 610 and the second magnet 810 have the same poles on facing surfaces. The lifting driver 800 may levitate or hold (or settle) the levitating knob 600 by driving the second magnet 810 upward or downward.

FIG. 2B shows the levitating knob 600 rises from the knob holder 700 and levitates. As shown in FIG. 2B, the lifting driver 800 lifts the second magnet 810 so that the first magnet 610 provided in the levitating knob is pushed up by a magnetic force of the second magnet 810 to rise. The lifting driver 800 may include an actuator device capable of linearly driving the second magnet 810 to ascend and descend.

At this time, lifting and driving distances of the second magnet 810 may be adjusted so that the levitating knob 600 rises from the knob holder 700 by a predetermined height to levitate.

Figure 3:
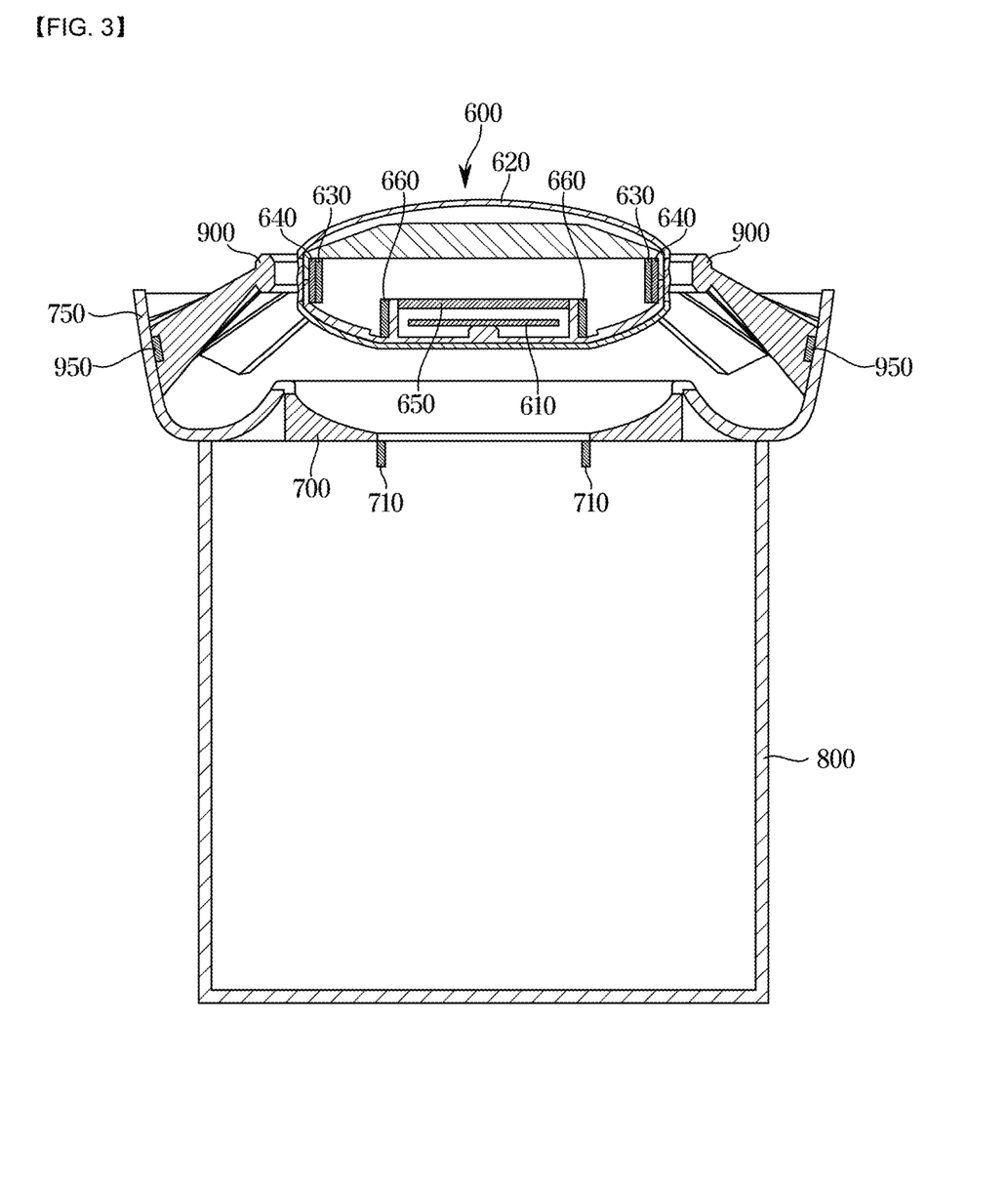
FIG. 3 is a schematic view illustrating a structure of a user interface device according to an embodiment of the disclosure.
Figure 4:
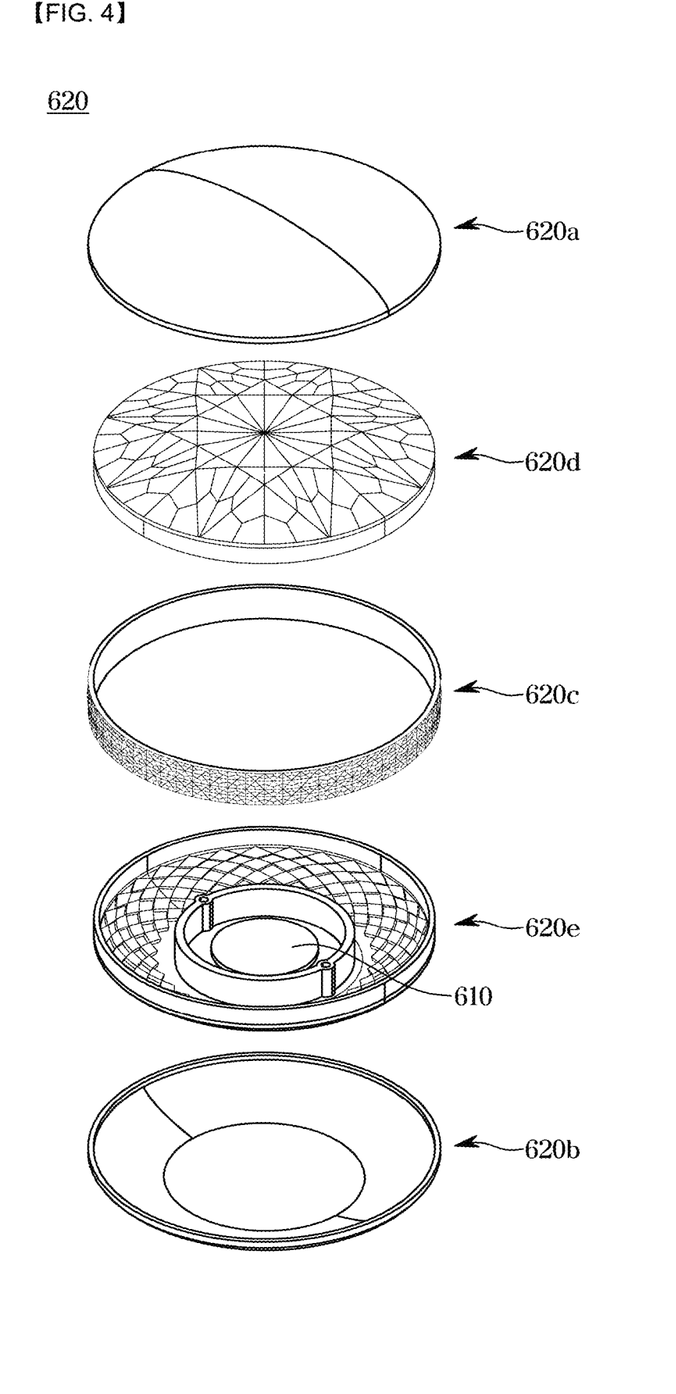
FIG. 4 is a schematic view illustrating an appearance of a levitating knob according to an embodiment of the disclosure.

FIG. 3 is a schematic view illustrating a structure of a user interface device according to an embodiment of the disclosure, and FIG. 4 is a schematic view illustrating a state of the levitating knob according to an embodiment of the disclosure.

Referring to FIG. 3, the levitating knob 600 may include a knob cover 620 that forms an exterior of the levitating knob 600, a first light emitting device 630 disposed inside the knob cover 620, an input detector 640 for detecting an input by a user's manipulation, and a knob controller 650 for controlling an operation of the levitating knob.

In this case, the knob cover 620 may be partially or entirely formed of a light-transmitting material.

Referring to FIG. 4, an appearance of the knob cover 620 may be seen in more detail. In the embodiment shown in FIG. 4, the knob cover 620 may include an upper cover 620a that forms an upper surface of the levitating knob 600, a lower cover 620b that forms a lower surface of the levitating knob 600, a side cover 620c that forms a side of the levitating knob 600, an upper surface decorative layer 620d for refracting or reflecting light generated from the first light emitting device 630 inside the upper cover 620a, and a lower decorative layer 620e for refracting or reflecting light generated from the first light emitting device 630 inside the lower cover 620b. The first magnet 610 may be provided inside the lower surface decoration layer 620e.

The upper and lower covers 620a and 620b may be formed of a transparent light-transmitting material so that light generated from the first light emitting device 630 there inside may be transmitted to the outside.

The upper and lower decorative layers 620d and 620e refract or reflect light generated from the first light emitting device 630. To this end, the upper and lower decorative layers 620d and 620e may have a polyhedral shape having a plurality of surfaces (or sides) and corners as shown in FIG. 4. Light generated from the first light emitting device 630 may be refracted or reflected through the plurality of surfaces and corners, or selectively transmit only the light in a predetermined wavelength range to express the colors.

Referring to FIG. 3, the knob holder 700 may include a power supply 710 for supplying power to the levitating knob 600. The levitating knob 600 may be held on the knob holder 700, but because it may rise and levitate from the knob holder 700, the power supply 710 is provided as a flexible material to continuously supply power even if the levitating knob 600 is levitating or held.

In another embodiment, the power supply 710 may supply power when the levitating knob 600 is held on the knob holder 700, and may not supply power when the levitating knob 600 is levitating from the knob holder 700. In this embodiment, the power supply 710 is provided with an electrode coming into contact with the levitating knob 600, and when the levitating knob 600 is held on the knob holder, the levitating knob 600 may be in contact with the electrode of the power supply 710 to receive power.

In another embodiment, the power supply 710 may be a wireless charging device. When the power supply 710 is provided as a wireless charging device, the power supply unit 710 may supply power even if not in direct contact with the levitating knob 600.

On the other hand, the knob controller 650 may include a wireless communicator capable of performing wireless communication with an external device, a power receiver 660 for receiving power from the power supply 710, and a rechargeable battery for storing the supplied power.

The knob controller 650 may including the power receiver 660 and the rechargeable battery to receive and store power from the power supply 710 of the knob holder 700. In one embodiment, the levitating knob 600 may receive power through the power receiver 660 only when it is held on the knob holder 700 and stores the power in the rechargeable battery, and may perform the operation using the power stored in the rechargeable battery only when it rises and levitates from the knob holder 700.

On the other hand, the knob controller 650 may include a wireless communication to perform wireless communication with an external device. Because the levitating knob 600 levitates in the air and operates, transmission of a detecting result input by a user's manipulation to an external device is required. At this time, the wireless communicator may transmit and receive information without wiring connected to an external device by performing wireless communication.

The input detector 640 may detect an input by a user's manipulation. The user may manipulate the levitating knob 600 in various ways, such as touching, rotating, or pressing down. At this time, the input detector 640 detects the user's manipulation, converts it into an electric signal, and transmits it to the knob controller 650. To detect such a user's manipulation, the input detector 640 may include various types of detecting devices such as a touch sensor, a gyroscope, and the like.

The first light emitting device 630 may selectively generate light of two or more colors. For example, the first light emitting device 630 may include red, green and blue light emitting diodes (RGB LEDs). The color or brightness of the first light emitting device 630 may be changed based on the operation of the user interface device 1000. In other words, the first light emitting device 630 may change color or brightness thereof based on a signal received through the wireless communicator. Accordingly, the user may visually identify the operation of the user interface device 1000 by visually identifying the levitating knob 600 illuminated by the first light emitting device 630.

Meanwhile, the first light emitting device 630 may change color or brightness based on detection information of the input detector 640. When the color or brightness of the first light emitting device 630 is changed based on the detection information of the input detector 640, the user may immediately identify that the input through the levitating knob 600 is normally performed, thereby improving feeling of manipulation. For example, the user may apply a touch input to the levitating knob 600, the input detector 640 detects the touch input, and the first light emitting device 630 change the color based on the detecting result of the input detector, so that the user may visually identify that the touch input is normally performed.

On the other hand, the user interface device 1000 may further include a anti-separation section 900 arranged to be spaced apart from the levitating knob 600 by a predetermined distance so that the raised levitating knob 600 does not deviate from the upper side of the knob holder 700, and a second light emitting device 950 that illuminates the anti-separation section 900.

The anti-separation section 900 has a ring shape spaced a predetermined distance from the side of the levitating knob 600 in a levitating state as shown in FIG. 3, and may be fixedly coupled to a cover 750 of the knob holder 700 through a plurality of legs. As such, because the anti-separation section 900 has a shape surrounding the side surface of the levitating knob 600 in a levitating state, the levitating knob 600 may be prevented from deviating to the side. Likewise, because the anti-separation section 900 has a shape surrounding the side surface of the levitating knob 600 in a levitating state and is spaced apart from the levitating knob 600 by a predetermined distance, thereby not disturbing the levitating knob 600 being levitating.

At this time, the anti-separation section 900 is formed of a light-transmitting material, and the second light emitting device 950 may apply a lighting to the inside of the anti-separation section 900. As such, when the second light emitting device 950 applies a lighting from the inside of the anti-separation section 900 made of a light-transmitting material rather than from the outside of the anti-separation section 900, the light is indirectly spread through the light-transmitting material, thereby enhancing aesthetics. In the embodiment shown in FIG. 3, the second light emitting device 950 may apply a lighting to the interior of the anti-separation section 900 at a position where the legs of the anti-separation section 900 is coupled with the cover 750 of the knob holder 700.

The second light emitting device 950 may selectively generate light of two or more colors. For example, the second light emitting device 950 may include RGB LEDs. The color or brightness of the second light emitting device 950 may be changed based on the detection information of the input detector. Like the first light emitting device 630, the second light emitting device 950 may change color or brightness based on the operation of the user interface device 1000. Accordingly, the user may visually identify the operation of the user interface device 1000 by visually identifying the anti-separation section 900 that is illuminated by the second light emitting device 950. In this case, the color or brightness of the second light emitting device 950 may change independently of the color or brightness of the first light emitting device 630.

Meanwhile, the second light emitting device 950 may change color or brightness based on the detection information of the input detector 640. When the color or brightness of the second light emitting device 950 is changed based on the detection information of the input detector 640, the user may immediately identify that the input through the levitating knob 600 is normally performed, thereby improving the feeling of manipulation.

Figure 5:
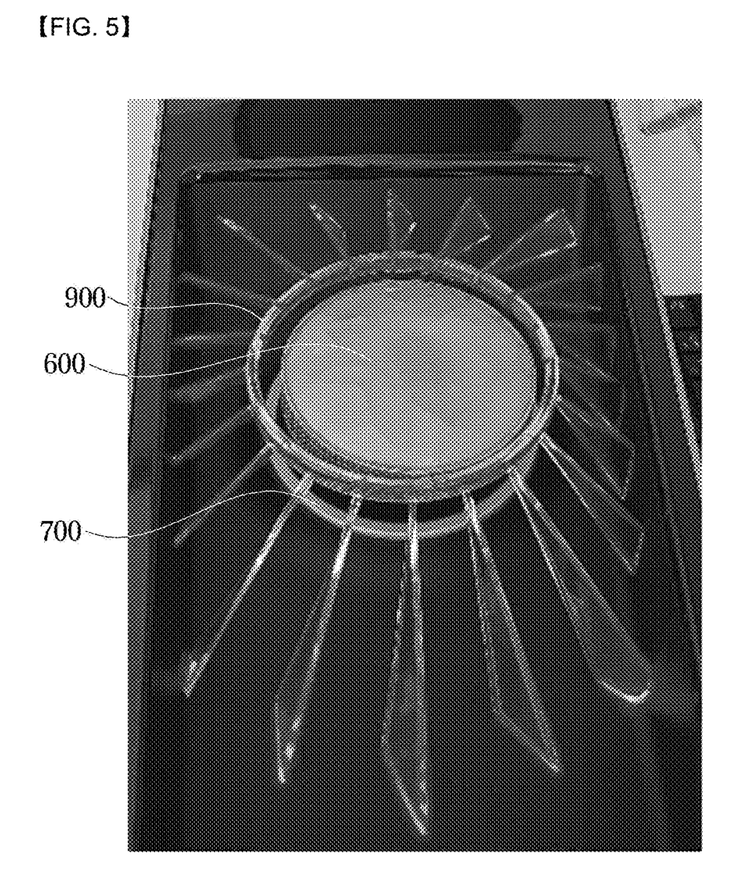
FIG. 5 is a schematic view illustrating an operation of a light emitting device of a user interface device according to an embodiment of the disclosure.

FIG. 5 is a schematic view illustrating the operation of the light emitting devices of a user interface device according to an embodiment of the disclosure.

In FIG. 5, in the user interface device 1000 as described above, the first and second light emitting devices 630 and 950 generate light to illuminate the levitating knob 600 and the anti-separation section 900. In FIG. 5, the first light emitting device 630 applies red light so that the levitating knob 600 appears red to the user, and the second light emitting device 950 applies blue light so that the anti-separation section 900 appears blue to the user.

At this time, based on the detection information of the input detector 640 of the levitating knob 600 or the operation of the user interface device 1000, the color or brightness of the first and second light emitting devices 630 and 950 may be changed. In this case, the color or brightness of the first and second light emitting devices 630 and 950 may change independently. In other words, even when the color of the first light emitting device 630 is changed from red to green, the color of the second light emitting device 950 may be maintained in blue. Furthermore, while the color of the first light emitting device 630 is maintained in red, only the color of the second light emitting device 950 may change from blue to green.

Figure 6A:
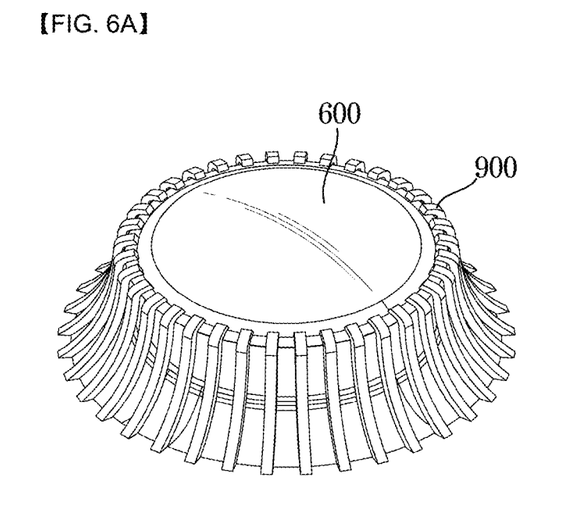
FIGS. 6A and 6B are schematic views illustrating a knob anti-deviation structure of a user interface device according to an embodiment of the disclosure.
Figure 6B:
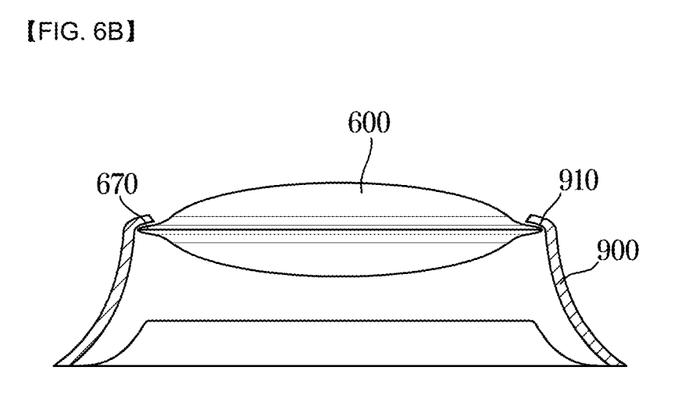

FIG. 6 is a schematic view illustrating a knob anti-deviation structure of a user interface device according to an embodiment of the disclosure.

The user interface device 1000 of the disclosure may be installed on the center fascia of the vehicle, so the user interface device 1000 needs to prevent the levitating knob 600 levitating in the air from deviating when a sudden stop or rapid acceleration is made according to the operation of the vehicle. In the case of the anti-separation section 900 shown in FIGS. 3 and 5, it is disposed on the side of the levitating knob 600 to prevent the levitating knob 600 from being separated to the side.

Meanwhile, FIGS. 6A and 6B show the user interface device 1000 capable of preventing the levitating knob 600 from being separated from the side as well as from being separated from the upper side. FIG. 6A is a view illustrating the levitating knob 600 and the anti-separation section 900 of the user interface device 1000, and FIG. 6B is a side view illustrating the levitating knob 600 and the anti-separation section 900.

In the embodiment shown in FIG. 6, the levitating knob 600 has a protrusion 670 having a protruding shape along an outer circumferential surface in a horizontal direction thereof, and the anti-separation section 900 may be disposed to be spaced apart by a predetermined distance so as to cover all or part of the upper side of the protrusion 670 of the levitating knob 200. To this end, as shown in FIG. 6, the anti-separation section 900 may have a section end 910 extending above the protrusion 670.

When the section end 910 extends to the upper side of the protrusion 670 as shown in FIG. 6, it is possible to prevent the levitating knob 600 from being separated upward. Meanwhile, because the section end 910 extends to the upper side of the protrusion 670 protruding along the outer circumferential surface, the upper surface of the levitating knob 600 is exposed to the user without being covered by the anti-separation section 900. Accordingly, the user may operate the levitating knob 600 through the exposed upper surface.

As is apparent from the above, the user interface device 1000 according to the embodiment of the disclosure may provide a new user experience by detecting the user's input while the levitating knob 600 is levitating in the holder.

Further, the user interface device 1000 according to the embodiment of the disclosure may provide feedback to the user by changing the color or brightness of the light emitting device according to the user's input.

Further, the user interface device 1000 according to the embodiment of the disclosure may prevent the levitating knob from deviating from the set position while levitating through the anti-separation section.

As described above, although a few embodiments of the disclosure have been shown and described, it would be appreciated by those skilled in the art that changes may be made in these embodiments without departing from the principles and spirit of the disclosure, the scope of which is defined in the claims and their equivalents.

What is claimed is:

1. A user interface device, comprising:
    a levitating knob configured to detect an input by a user's manipulation;
    a knob holder configured to be held when the levitating knob does not levitate;
    a lifting driver provided below the knob holder so that the levitating knob rises from the knob holder and levitates; and
    an anti-separation section disposed to be spaced apart from the levitating knob by a predetermined distance so that the raised levitating knob does not deviate from an upper side of the knob holder; and
    wherein the levitating knob is provided with a first magnet,
    the lifting driver is provided with a second magnet arranged to face the first magnet, the second magnet having the same pole as that of the first magnet on facing surface thereagainst,
    the lifting driver is configured to levitate or hold the levitating knob by driving up or down the second magnet.

2. The user interface device of claim 1, wherein the levitating knob comprises:
    a knob cover forming an exterior of the levitating knob;
    a first light emitting device disposed inside the knob cover; and
    an input detector configured to detect the input by the user's manipulation;
    wherein the knob cover is partially or entirely formed of a light-transmitting material.

3. The user interface device of claim 2, wherein the first light emitting device is configured to change color or brightness thereof based on detection information of the input detector.

4. The user interface device of claim 2, wherein the levitating knob further comprises a wireless communicator for performing wireless communication with an external device, and
    the first light emitting device is configured to change color or brightness based on a signal received through the wireless communicator.

5. The user interface device of claim 2, wherein the knob holder further comprises a power supply for supplying power to the levitating knob, and
    the levitating knob further comprises:
    a power receiver configured to receive power from the power supply; and
    a rechargeable battery configured to store the supplied power.

6. The user interface device of claim 5, wherein the power supply is a wireless charging device.

7. The user interface device of claim 1, further comprising a second light emitting device configured to apply a lighting to the anti-separation section.

8. The user interface device of claim 7, wherein the anti-separation section is formed of a light-transmitting material, and
    the second light emitting device applies a lighting to an inside of the anti-separation section.

9. The user interface device of claim 7, wherein the levitating knob comprises an input detector configured to detect an input by a user's manipulation, and
    the second light emitting device is configured to change color or brightness based on detection information of the input detector.

10. The user interface device of claim 1, wherein the levitating knob is provided with a protrusion having a shape protruding along an outer circumferential surface in a horizontal direction thereof, and
    the anti-separation section is arranged to be spaced apart by a predetermined distance so as to cover all or a part of an upper side of the protrusion of the levitating knob.

* * * * *